United States Patent
Randhava et al.

(10) Patent No.: US 12,528,698 B2
(45) Date of Patent: Jan. 20, 2026

(54) PLASMA INDUCED HYDROGEN PRODUCTION

(71) Applicant: Prime Plasma, Inc., Mt. Prospect, IL (US)

(72) Inventors: Surjit S. Randhava, Arlington Heights, IL (US); Sarabjit S Randhava, Evanston, IL (US); Bongjoo Bryce Shim, Rancho Palos Verdes, CA (US)

(73) Assignee: PRIME PLASMA, INC., Mt. Prospect, IL (US)

( * ) Notice: Subject to any disclaimer, the term of this patent is extended or adjusted under 35 U.S.C. 154(b) by 460 days.

(21) Appl. No.: 18/136,473

(22) Filed: Apr. 19, 2023

(65) Prior Publication Data
US 2024/0351868 A1    Oct. 24, 2024

(51) Int. Cl.
*C01B 3/24*    (2006.01)
*B01D 45/16*   (2006.01)
(Continued)

(52) U.S. Cl.
CPC .............. *C01B 3/24* (2013.01); *B01D 45/16* (2013.01); *B01D 46/04* (2013.01); *B01D 53/047* (2013.01);
(Continued)

(58) Field of Classification Search
CPC ............ C01B 3/24; C01B 3/56; C01B 32/05; C01B 2203/0272; C01B 2203/042; C01B 2203/0833; C01B 2203/0883; C01B 2203/0894; C01B 3/50; C01B 3/501; B01D 45/16; B01D 46/04; B01D 53/047;
(Continued)

(56) References Cited

U.S. PATENT DOCUMENTS

| 8,002,854 B2 | 8/2011 | Muradov |
| 10,100,200 B2 | 10/2018 | Johnson et al. |

(Continued)

FOREIGN PATENT DOCUMENTS

| AU | 2013201704 |   | 4/2013 |   |
| EP | 2022772 A1 |   | 8/2007 |   |
| WO | WO 2022/087708 | * | 5/2022 | ............... C01B 3/24 |

OTHER PUBLICATIONS

Written Opinion of the International Searching Authority in PCT/US24/25580 mailed Jul. 17, 2024 (Year: 2024).*
Finke, J.R. et al., Plasma Pyrolysis of Methane to Hydrogen and Carbon Black, Ind. Eng. Chem. Res., 2022, 41:1425-1435.

*Primary Examiner* — Daniel C. Mccracken
(74) *Attorney, Agent, or Firm* — Jeanette M. Braun, Esq.; Braun IP Law, LLC

(57) ABSTRACT

A process for the production of hydrogen from an aliphatic hydrocarbon feed, uses a plasma reactor that thermodynamically breaks down the hydrocarbon into its constituent hydrogen and carbon building blocks while using the heat of the reaction product to preheat the feed high enough temperature for plasma reactor. The plasma can be energized with electrical power derived from solar, wind or hydro sources. A heat interchanger transfers the thermal energy of the reaction products to preheat the hydrocarbon feed stream thereby significantly decreasing energy needs of the process. A dual PSA system provides high hydrogen recovery at high purity. The reaction products essentially consist of hydrogen and carbon black.

22 Claims, 2 Drawing Sheets

(51) Int. Cl.
  *B01D 46/04*   (2006.01)
  *B01D 50/10*   (2022.01)
  *B01D 53/047*  (2006.01)
  *C01B 3/56*    (2006.01)
  *C01B 32/05*   (2017.01)

(52) U.S. Cl.
  CPC ............... *C01B 3/56* (2013.01); *C01B 32/05* (2017.08); *B01D 50/10* (2022.01); *B01D 2256/16* (2013.01); *C01B 2203/0272* (2013.01); *C01B 2203/042* (2013.01); *C01B 2203/0833* (2013.01); *C01B 2203/0883* (2013.01); *C01B 2203/0894* (2013.01); *C01P 2004/50* (2013.01); *C01P 2004/61* (2013.01); *C01P 2004/62* (2013.01); *C01P 2004/64* (2013.01); *C01P 2006/80* (2013.01)

(58) Field of Classification Search
  CPC ............... B01D 50/10; B01D 2256/16; C01P 2004/50; C01P 2004/61; C01P 2004/62; C01P 2004/64; C01P 2006/80
  See application file for complete search history.

(56) References Cited

U.S. PATENT DOCUMENTS

| | | |
|---|---|---|
| 10,370,539 B2 | 8/2019 | Johnson et al. |
| 10,619,026 B2 | 4/2020 | Reedy et al. |
| 10,808,097 B2 | 10/2020 | Hardman et al. |
| 11,149,148 B2 | 10/2021 | Taylor et al. |
| 11,203,692 B2 | 12/2021 | Hoermann et al. |
| 2017/0058128 A1 | 3/2017 | Johnson et al. |
| 2017/0327373 A1 | 11/2017 | de Graffenried, Sr. |
| 2020/0283293 A1 | 9/2020 | McFarland et al. |
| 2022/0306462 A1* | 9/2022 | Henschel .................. C25B 1/02 |

\* cited by examiner

PLASMA INDUCED HYDROGEN PRODUCTION

FIELD OF THE INVENTION

The present invention relates, generally, to processes for the production of hydrogen from methane or other aliphatic hydrocarbons utilizing an electrically produced plasma without the production of carbon dioxide. The process further relates to the co-production of valuable carbon.

BACKGROUND OF THE INVENTION

Hydrogen

Hydrogen can provide a fuel that leaves no hydrocarbon compounds. Thus, hydrogen can provide completely 'clean' energy when burned or used in a fuel cell; When used for energy production it only leaves water as a by-product. Hydrogen can provide the transportation energy of the 21st century. However, gaseous hydrogen exists almost nowhere on earth, so it requires a means for production.

Hydrogen stands as the most plentiful molecule on earth, but in almost all cases, bound to other elements such as oxygen and carbon in the form of water and hydrocarbons, in particular methane. Thus far, only highly intensive energy methods can produce gaseous hydrogen. Today steam reforming of fossil hydrocarbon sources produces about 95% of available gaseous hydrogen. It is made from fossil fuels using a process commonly referred to as steam reforming. Producing one ton of hydrogen by this process results in ten tons of CO2 emissions. Thus, the currently most practiced production of H2 leaves the worst carbon footprint. The challenge is to find a way of producing hydrogen without emitting $CO_2$.

Hydrogen Production Enthalpies
Steam Methane Reforming (SMR)
The Overall Reaction is Shown Below:

| $CH_4 + 2\,H_2O \Leftrightarrow CO_2 + 4H_2$ | $\Delta H$ - +252 kJ | 32.9 kW/kg $H_2$ |

Methane reacts with steam at high pressure and temperatures of around 900° C. using nickel-based catalysts. Simultaneously, the water-gas shift reaction occurs and partially converts some of the resulting carbon monoxide (CO) to carbon dioxide (CO2) and additional hydrogen. Combusting part of the methane provides heat needed for the high temperature of the SMR reaction.

Economic factors along with a modest energy requirement drive the use of a fossil fuel feedstock in SMR and results in the production of carbon monoxide and carbon dioxide in large quantities which increases SMR's environmental impact. Hydrogen produced with fossil fuels is known as 'grey' hydrogen. Despite yielding grey hydrogen, SMR dominates current hydrogen production because of its low cost.

Water Electrolysis

Water hydrolysis uses electricity to 'split' water into hydrogen and oxygen.
The Overall Reaction is Shown Below:

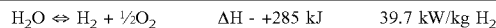

| $H_2O \Leftrightarrow H_2 + \tfrac{1}{2}O_2$ | $\Delta H$ - +285 kJ | 39.7 kW/kg $H_2$ |

Water hydrolysis passes an electric current between an anode and a cathode that are immersed in an electrolyte containing water. Water hydrolysis requires high amounts of electrical energy but by using only water as the feed and water electrolysis produces green hydrogen as long as the electricity is renewably sourced.

The energy requirement depends on the electrical efficiency of the electrolytic cell for the splitting of the water. Various side reactions and the formation of by-products give water hydrolysis a typical efficiency of around 70-80%

Plasma Cracking of Methane

Plasma's energy characteristics of and efficiency provide operational benefits in converting hydrocarbons species for chemical manufacture or energy production. The plasma dissociation of methane is one such application.

Thermal decomposition/pyrolysis of methane uses electric power as the electrodynamic source to produce hydrogen, carbon (C), and little else.

The overall reaction is shown below:

| | | |
|---|---|---|
| $CH_4 \Leftrightarrow C + 2H_2$ | $\Delta H = +75.60$ kJ @ 25° C. | 5.20 kW/kg H2 |
| | $\Delta H = +77.59$ kJ @ 125° C. | 5.34 kW/kg H2 |
| | $\Delta H = +80.31$ kJ @ 225° C. | 5.52 kW/kg H2 |
| | $\Delta H = +90.33$ kJ @ 1025° C. | 6.21 kW/kg H2 |
| | $\Delta H = +90.37$ kJ @ 1125° C. | 6.22 kW/kg H2 |
| | $\Delta H = +90.23$ kJ @ 1225° C. | 6.21 kW/kg H2 |
| | $\Delta H = +89.94$ kJ @ 1325° C. | 6.19 kW/kg H2 |
| | $\Delta H = +89.50$ kJ @ 1425° C. | 6.16 kW/kg H2 |
| | $\Delta H = +89.10$ kJ @ 1500° C. | 6.13 kW/kg H2 |

The above temperatures maintain C as a solid. Assuming C to be a liquid at 1500° C. gives a reaction enthalpy of 4100 and in excess of 700 kJ/mole.

The thermal decomposition of methane is exhibited by the endothermic reaction. This reaction must occur in the absence of oxygen to prevent combustion of methane to $CO_2(g)$ and $H_2O(g)$. Consequently, the process requires pyrolysis conditions.

Thus, plasma decomposition of methane offers a unique and extremely energy efficient process for cracking methane into hydrogen and carbon black, particularly high grade electroconductive carbon black. Plasma technology can also provide a quick reaction time that yields smaller carbon particles; smaller carbon particles typically have more desired properties.

Electro conductive carbon black (ECCB) differs from ordinary carbon black in many beneficial ways. ECCB constitutes high performance carbon black that offers better technical indexes—e.g., strength and toughness along with the most reliability and cost effectiveness for conductive compounds. ECCB types include conductive, superconductive, and extra conductive. In particular, particle size, structure, and porosity yield these properties with increased conductivity leading to increased surface area and oil absorption number (OAN). In addition, small particle size yields carbon black with a high porosity and higher interaggregate attractive force. ECCB can form a conductive network by adding insulating polymers (plastics and rubbers) to reduce the resistivity of plastics and rubbers; it can also provide antistatic effects.

In summary, an enthalpy comparison shows the lower thermodynamic cost of plasma cracking vs SMR:
37.8 kJ/mol $H_2$ vs. 63 kJ/mol $H_2$ Relative enthalpies also show that plasma cracking is far less thermodynamically costly than liquid water splitting:
37.8 kJ/mol $H_2$ vs. 285 kJ/mol $H_2$ Carbon Black Carbon black is virtually 97% or higher elemental carbon. Carbon black constitutes the vast bulk of material (called "filler") in car and truck tires, as well as in printing inks, coatings, and plastic products in use today.

Carbon black is a nanostructured material composed of fine quasi-spherical particles, called primary particles (or nodules), linked together to form aggregates or agglomerates. Aggregates and agglomerates vary widely in complexity having more complex or less complex structures.

The primary particles have a spheroidal shape and are the fundamental building block of carbon black. Depending on quality, a primary particle can vary in diameter from a few tenths to several hundred nanometers with a typical range from 15-300 nanometers (nm). These primary particles generally comprise small crystallites showing a turbostratic arrangement. Control of the processing conditions that form the primary particles can, to a certain extent, produce different grades of primary particles. The applications of carbon black materials depend on a wide number of physico-chemical properties.

The primary particles fuse strongly into aggregates forming an aciniform (grape-like) morphology possessing dimensions ranging from 85-500 nm. Strong electrical forces maintain the integrity of the aggregates and promote the formation of agglomerates which possess a dimension ranging from 1-100 micrometers (μm) and are held together principally by van der Waals forces. Strong bonding or fusing of the spheroidal primary particles provide the aggregates with a high ability to withstand shear forces; aggregates are the smallest dispersible units.

An aggregate's structure and complexity stem from the arrangement of the primary particles therein and the extent of winding and/or branching of the primary particle arrangements that form the aggregate. Aggregates with more entwining and/or splitting of the particle arrangements within aggregate yield a "high structure" whereas more interlacing and/or forking of the particle arrangement in the aggregate gives a "low structure".

In a similar manner the configuration and arrangement of the aggregates in the agglomerate determine its complexity. Thus, agglomerates derive their properties from the aggregate and particle configuration within the aggregate.

Typically, primary particles do not exist in isolation in carbon black powder. As primary particles fuse and/or covalently bond together, the primary particle size distribution is not relevant to the properties of carbon black. The tendency of agglomerates to break apart under applied force makes accurate measurement of them difficult.

A significant collateral benefit of the plasma cracking, thermal decomposition of methane, is the production of solid carbon in the form of carbon black. The carbon black market value can reach $1,000 or more per ton for normal grades and over $3,000 per ton for specialty conductive grades. The production of carbon black also offsets the carbon footprint of producing hydrogen and thereby lowers the environmental impact of producing hydrogen. Since the plasma cracking thermal decomposition of methane occurs in the absence of oxygen, the process produces no direct carbon emissions. Additionally, by using biomethane as the feed gas, and supplying the thermal energy with electricity from renewable sources, the products of a plasma cracking process—hydrogen and carbon—can meet classification of a green fuel.

Thermal plasma is an intense heat source, often referred to as the fourth state of matter. Plasma forms when a gas receives sufficient energy to strip electrons from atoms thereby producing an ionized gas. This results in the formation of a 'plasma arc' or column containing charged species (negative electrons and positive ions) which, although electrically neutral overall, is electrically conductive. The exposure of hydrocarbons, in particular methane, to a high temperature plasma arc results in its thermal decomposition. The hydrogen and carbon bonds are broken producing hydrogen ions which quickly combine to produce pure hydrogen and solid carbon. The high temperatures in the plasma reactor also promotes light emission energy that can accelerate methane decomposition via a photo-catalytic effect producing highly reactive free radicals. These free radicals can act to accelerate reaction rates and promote further cracking of the methane. Thermal plasma induces a high degree of ionization resulting in extreme temperatures; the center of a plasma arc can reach over 10,000° C. Electricity generates the plasmas and the arc finds uses as a heat source in chemical or other industrial process wherein the plasma generated heat significantly reduces the carbon footprint of such process compared to fossil fuel heat sources such as natural gas or diesel.

Thus, the plasma produces carbon black, a nanometric form of carbon which has specific properties for industrial use. The properties of the carbon black are dependent on controlling the operating conditions, specifically temperature, within the plasma reactor which operates at temperatures several hundred degrees higher than indicated in prior art.

PRIOR ART

U.S. Pat. Nos. 10,100,200, 10,808,097, and 10,618,026 disclose production of carbon black and hydrogen using a plasma reactor and heat exchange.

U.S. Pat. No. 11,149,148 discloses the addition of secondary heat in a plasma process for producing carbon black and hydrogen. Heat may be added at the reactor wall if there is a recirculating flow.

U.S. Pat. No. 11,203,692 discloses cooling the throat of plasma reactor by preheating plasma gas.

US2017/0058128 discloses the use of hot air or recycled hydrogen to recover heat from a plasma reactor effluent.

These arrangements and processes provide various ways to improve the efficiency and reduce the cost of producing hydrogen and carbon black from aliphatic various hydrocarbon feeds using a plasma reactor. While these approaches do offer improvement in product production and reducing the production of CO2, further improvements to process efficiency and product recovery would advance the use of plasma reactors to supply needed hydrogen while further reducing the environmental carbon footprint of hydrogen production. Thus, the challenge for plasma processes is to improve the efficiency of producing and recovering hydrogen and carbon black while essentially eliminating $CO_2$ emissions.

SUMMARY OF THE INVENTION

It is the object of the present invention to provide a process of economically and efficiently producing hydrogen without production of carbon dioxide.

It is a further object of this invention to reduce heat losses and thereby drive down energy costs of the plasma reactor operation.

It is another object of this invention to reduce the cost of obtaining hydrogen at high concentrations from plasma processes for producing hydrogen.

It is a yet further object of this invention to provide high purity hydrogen and high value carbon black simply and efficiently.

The present invention accomplishes these objects by using a plasma reactor in a unique arrangement for transferring heat from a plasma reactor effluent to a plasma reactor feed; a particle removal system that efficiently and effectively recovers carbon black while providing an essentially particle free hydrogen containing gas having less than 10 ppm of solids. The hydrogen containing gas is compressed and directed to a specifically sized dual PSA arrangement to recover high purity hydrogen with minimal hydrogen loss. The process of this invention may also integrate the PSA recovery system with the supply of gas that stabilizes the plasma reactor.

Thus, in one embodiment the process directly recovers heat from the plasma reactor effluent and uses a two-stage carbon black recovery system to provide a hydrogen containing gas that passes to an arrangement of two PSA units that deliver hydrogen at a purity of 99.99%.

In a more complete embodiment an input feed, comprising and typically consisting essentially of an aliphatic hydrocarbon, preferably methane, flows through an interchanger and then to a plasma reactor to produce a gaseous reactor effluent that passes through the interchanger in indirect heat exchange to use the enthalpy of the product gases for heating the feedstock. In a preferred embodiment, natural gas from a pipeline or from anaerobic digesters provides a stoichiometrically optimized feed stock.

In another preferred embodiment the aliphatic hydrocarbon feed has a low carbon number; more preferably comprises methane; and most preferably is pipeline grade methane made by removing $CO_2$ from biogas.

In another preferred embodiment the feed to the process is low pressure natural gas that has been appropriately dehumidified and stripped of a majority of carbon oxides.

In another preferred embodiment the process produces fuel cell grade hydrogen using natural gas as the aliphatic hydrocarbon feedstock.

In a full embodiment, an interchanger heats a feed of aliphatic hydrocarbons, preferably consisting essentially of methane, to a temperature in a range of 650° C. to 900° C. that passes to a plasma reactor comprising two carbon electrodes separated by a gap wherein each electrode receives one of a positive and an negative electrical charge from a DC power source to create a plasma environment having a temperature in a range of 1300-1600° C., preferably from 1400-1550° C. and more preferably at around 1500° C. The plasma environment produces an output stream comprising hydrogen, carbon (consisting mostly of carbon black) and aliphatic hydrocarbons. A stabilizing gas injected in or near the gap between the two electrodes stabilizes the plasma environment. The output stream passes through the interchanger and indirectly transfers heat from the output stream that at least partially heats the input feed and cools the output stream to produce a cooled stream with a temperature in a range of 600 to 1150° C. The cooled stream passes to a secondary heat recovery zone to recover additional heat from the cooled stream and produce a cool gas stream with a temperature typically in the range of 30 to 95° C. The cool gas stream enters a particle separator that separates particles comprising carbon from the cool stream to produce a gas phase separator stream comprising hydrogen and a particle output stream comprising carbon. A compression step raises separator stream pressure to a range of 6 to 15 barg. that passes to as first pressure swing adsorption unit for recovery of a first permeate that provides a first hydrogen output stream at a concentration of at least 99.99% and a first retentate stream containing hydrogen. The first retentate stream passes the first retentate to a second pressure swing adsorption unit for recovery of a second retentate stream and a second a permeate stream comprising an additional hydrogen output stream with a hydrogen concentration of 99.99 wt. %. The second retentate may pass to an on-site boiler for additional heat recovery.

DETAILED DESCRIPTION OF THE INVENTION

Figure 1:
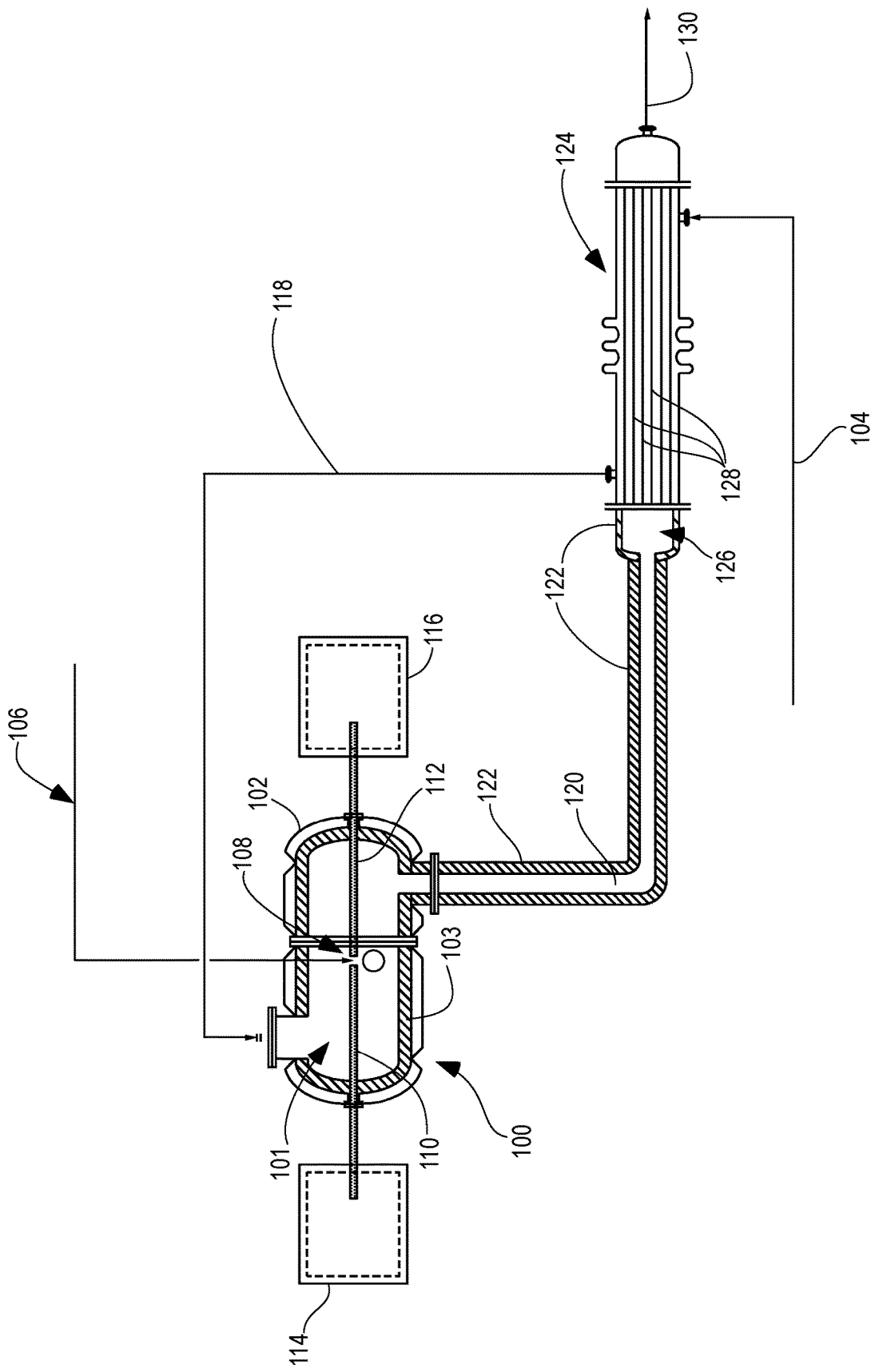
FIG. 1 shows a simplified process flow schematic of a plasma reactor and interchanger portion of a process of this invention.
Figure 2:
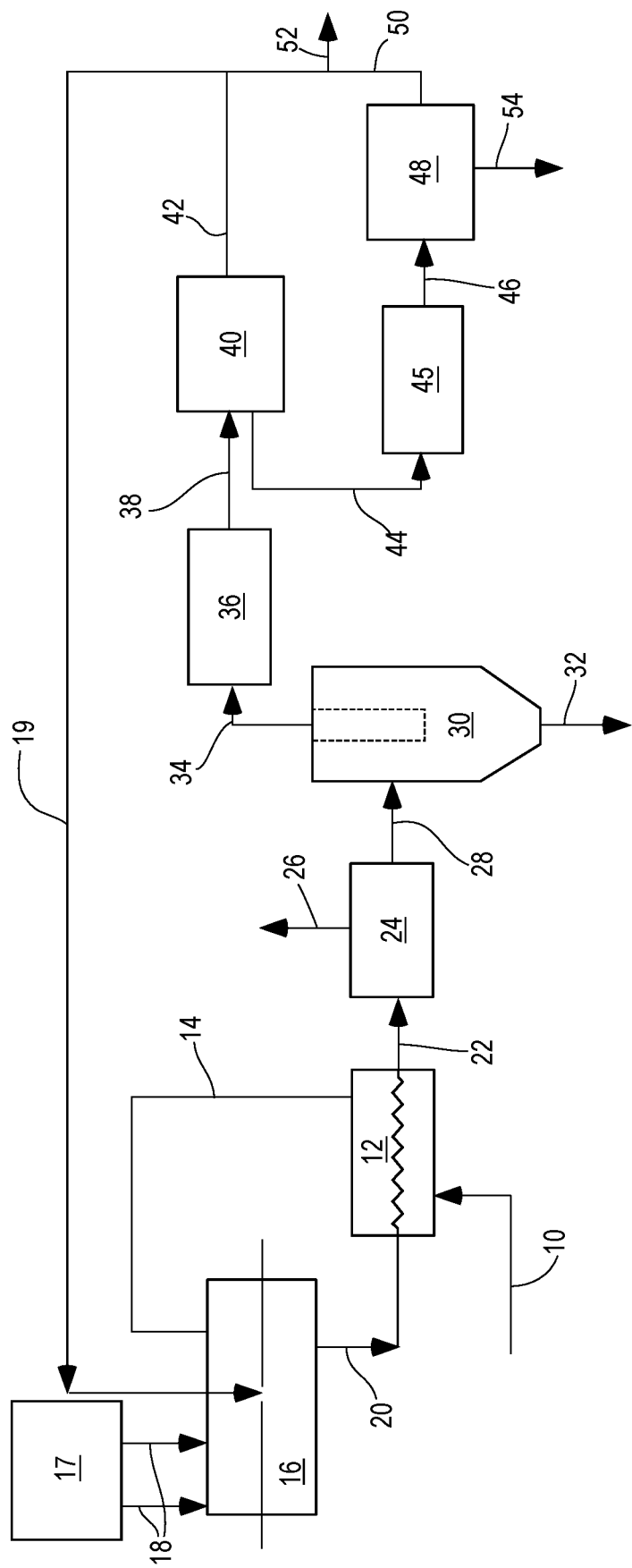
FIG. 2 depicts a process flow schematic of a plasma process showing a process and equipment arrangement for producing high purity hydrogen and carbon black from an aliphatic hydrocarbon.

Further description of this invention will follow the flow arrangements and details of FIGS. 1 and 2. The description of this invention in the context of FIGS. 1 and 2 is not meant to limit the many variations of flow arrangements that may incorporate elements of this invention. Those skilled in the art will appreciate the manner in which they may adapt this invention to process arrangements that incorporate its teachings. For example, each of the process flows can have multiple banks of plasma reactor arrangements operating in parallel to balance power demand.

FIG. 1 shows a basic flow arrangement of a plasma reactor 100 and an interchanger 124 for cracking an input feed 104 of aliphatic hydrocarbons preferably comprising natural gas. In this embodiment feed input 104 is directed into the plasma reactor 100. Plasma reactor 100 has a chamber 101 in which proximate ends of two juxtaposed, graphite electrodes 110, 112 extend into plasma reactor 100 from opposite sides. A pair of electrode manipulator assemblies 114, 116 each retain one of the electrodes 110, 112 and control its position within plasma reactor 100. A refractory lining 103 covers the inside of a metal shell of plasma reactor 100 and protects the metal shell from the high heat of the plasma reaction. In certain cases, the plasma reactor may include water cooling of the metal shell.

The manipulator devices 114, 116 together provide enough DC power to each electrode 110, 112 so that movement of the energized electrodes close enough to each other will initiate a plasma arc across a gap 108. Each one of the electrodes has its own manipulation device to program separately control each electrode 110, 112 to move in conjunction and maintain the plasma arc and desired power rating.

A heated input stream 118 enters the chamber and is directed to the plasma arc that initiates molecular decomposition of heated input stream. The plasma environment subjects the aliphatic hydrocarbon to pyrolysis and creates an ionic field that accelerates the reaction. That plasma also emits light energy resulting in a further accelerated decomposition of the reactants producing highly reactive free radicals. These free radicals result in a rapid reaction rate and provide a very close approach to complete pyrolysis of the heated feed 118. The plasma environment will not only subject the aliphatic hydrocarbon to pyrolysis but also create an ionic field that accelerates the reaction.

Injecting the gas from input stream 118 directly through the arc can potentially cause arc instability and interfere with the formation of the carbon product. Line 106 injects a small amount of a stabilizing gas such as hydrogen or argon in the proximity of gap 108 to mitigate any instability. In a preferred embodiment, this plasma stabilizing gas is hydrogen. Hydrogen has another important function in that it minimizes electrical shorting due to the conductivity of the carbon produced.

This invention can advantageously supply recycled hydrogen from a hereinafter described separation system into line 106 to provide the stabilizing gas. In the case of recycle hydrogen typically about 0.5 to 1% of the input feed stream will provide the hydrogen needed by line 106. Bleeding and recycling hydrogen results in no loss of process productivity.

Sufficient power is supplied to the electrodes 110, 112 to maintain the gas temperatures in the plasma of 1300-1600° C., preferably from 1400-1550° C. and more preferably at around 1500° C. A temperature above or below 1500° C. ensures an almost complete conversion of the heated input feed and creates a nano particle carbon product with desirable characteristics for product applications. A well-designed plasma reactor converts 90-99%, preferably 95-98% of the entering hydrocarbon. Thermodynamic limitations prevent attainment of a 100% conversion.

An effluent of hot gas comprising primarily hydrogen and fine carbon particles exits plasma reactor 100 through a pipe 120 and enters an interchanger 124. A refractory lining 122 covers the interior wall of the pipe 120 and the interior wall of an inlet manifold 126 of interchanger 124. Inlet manifold 126 distributes the hot gas from line 120 to heat exchange heat exchange tubes 128 of interchanger 124.

Input feed 104 enters the shell side of interchanger 124 and is heated by the hot gases from pipe 120 such that the heated input stream exits interchanger 124 at a temperature in a range of 800-900° C. and preferentially at 850° C. or higher to provide the heated input stream 118. Avoiding input feed temperatures above 900° C. can prevent auto pyrolysis of hydrocarbons in the input stream and obviate problems of carbon deposition and plugging in the hydrocarbon transfer lines.

Since the interchanger works with tube side temperatures around 1500° C., embrittlement of metallic heat exchanger tubes is prevalent at these conditions. The high loading of nanoparticles in the plasma reactor effluent stream that passes through the interchanger tubes and impinges on the walls subjects the interchanger tubes to high abrasive wear. At the same time efficient heat recovery requires a high heat transfer rate. Thus, there is great importance on the selection of tube material and tube design in interchanger 124.

Silicon carbide (SiC) is an appropriate material for the interchanger tubes at these high temperatures and particulate loading conditions. Suitable silicon carbide may be made either by pressure-less sintering or reaction sintering. Tubes made of sintered silicon carbide (SSiC) have been found to best meet the extreme service conditions of the interchanger tubes. SSiC is also one of the hardest high-performance materials available for heat exchanger tubes; its hardness exceeds that tungsten carbide by more than 50%. Thus, SSiC tubes provide superb corrosion resistance. Compared to reaction sintering, pressure-less sintered silicon carbide has higher purity, better mechanical properties and most importantly, a thermal conductivity that can almost equal that of commonly used graphite tubes. Depending on the supplier, SSiC tubes can provide a thermal conductivity twice that of tantalum, 5 times that of stainless steel, 10 times that of Hastelloy®, and 15 times that of glass thereby providing high thermal efficiency that requires less heat transfer area. SSiC tubes can also provide nearly universal corrosion resistance against virtually all chemicals. Finally, SSiC tubes provide total impermeability at extreme temperature conditions. Therefore, the use of SSiC for the tubes permits not only higher tube side velocities but also commensurately improved heat transfer.

Hexoloy® SiC tubes are particularly suitable for the tubes for interchanger 124. Such tubes can have a density in excess of 98% of theoretical and complete imperviousness without any impregnation. Hexoloy® SiC tubes provide extreme hardness and virtually eliminate contamination in high purity applications.

Interchanger 124 discharges a cooled gas stream 130 that comprises hydrogen, carbon nanoparticles, and other impurities such as unreacted methane in a concentration of less than 2%. Cooled gas stream 130 exits interchanger 124 at temperatures ranging from 1150-1200° C., and more preferably at 1175° C. The interchanger cools the plasma reactor effluent of line 130 to about 1100° C. to provide a cooled gas stream for downstream recovery of high purity hydrogen and carbon black. These temperatures protect the shell side of interchanger 124 from damage by excessive heat exposure. As hereinafter described cooled gas stream 130 goes on to further processing in accordance with this invention to recover high purity hydrogen and carbon black.

Table 1 below presents an example for a case that does not pass input feed 104 through interchanger 124 but passes 416.3 kg/h of input feed directly into reactor 100. The study was conducted using Aspen Plus V11.

TABLE 1

|  |  | Stream No. | | |
| --- | --- | --- | --- | --- |
|  | Unit | 104 | 120 | 130 |
| Molar Flow | kgmole/h | 25.95 | 75.78 | 75.78 |
| Mass Flow | kg/h | 416.32 | 416.32 | 416.32 |
| Temperature | C. | 30.00 | 1500.00 | 1150.00 |
| Pressure | barg | 2.00 | 2.00 | 1.90 |
| Vapor Flow | Nm$^3$/h | 581.65 | 1140.03 | 1140.03 |
| Vapor Flow | m$^3$/h | 216.10 | 1671.39 | 1387.69 |
| Vapor Fraction |  | 1.0000 | 0.6712 | 0.6712 |
| Molecular Weight |  | 16.04 | 5.49 | 5.49 |
| Molar Flow (Methane) | kgmole/h | 25.95 | 1.04 | 1.04 |
| Molar Flow (Hydrogen) | kgmole/h | 0.00 | 49.83 | 49.83 |
| Molar Flow (Carbon) | kgmole/h | 0.00 | 24.91 | 24.91 |
| Molar Flow (Carbon Monoxide) | kgmole/h | 0.00 | 0.00 | 0.00 |
| Molar Flow (Carbon Dioxide) | kgmole/h | 0.00 | 0.00 | 0.00 |
| Molar Frac (Methane) | mol. fr | 1.0000 | 0.0137 | 0.0137 |

TABLE 1-continued

|  | Unit | Stream No. 104 | Stream No. 120 | Stream No. 130 |
| --- | --- | --- | --- | --- |
| Molar Frac (Hydrogen) | mol. fr | 0.0000 | 0.6575 | 0.6575 |
| Molar Frac (Carbon) | mol. fr | 0.0000 | 0.3288 | 0.3288 |
| Molar Frac (Carbon Monoxide) | mol. fr | 0.0000 | 0.0000 | 0.0000 |
| Molar Frac (Carbon Dioxide) | mol. fr | 0.0000 | 0.0000 | 0.0000 |
| Molar Enthalpy | kcal/kgmole | −17768.01 | 21947.37 | 17777.71 |
| Mass Enthalpy | kcal/kg | −1107.54 | 3994.72 | 3235.78 |
| Heat Flow | kcal/s | −128.08 | 461.97 | 374.20 |
| Molar Density | kgmole/m$^3$ | 0.12 | 0.03 | 0.04 |
| Mass Density | kg/m$^3$ | 1.93 | 0.17 | 0.20 |

Table 2 shows the DC energy consumption for this plasma reactor without the use of interchanger 124.

TABLE 2

| | |
| --- | --- |
| CH$_4$ converted in reactor | 25.95 kgmole/h |
| Enthalpy per mole @ 1500° C. for CH$_4$ conversion | 89.10 kJ/mole |
| Net enthalpy required from DC plasma | 2,312,145 kJ/h<br>643 kW |
| Energy to preheat feed to reactor 30° to 1500° C. | 2,700,000 kJ/h<br>750 kW |
| Electrode losses | 50 kW |
| Reactor furnace heat losses | 250 kW |
| Total power requirement | 1,693 kW |

Table 3 shows an example of a case in accordance with FIG. 1 that passes 416.3 kg/h of input feed 104 through interchanger 124 and then into reactor 100. The study was conducted using Aspen Plus V11.

TABLE 3

|  |  | Stream No. 104 | Stream No. 118 | Stream No. 120 | Stream No. 130 |
| --- | --- | --- | --- | --- | --- |
| Molar Flow | kgmole/h | 25.95 | 25.95 | 75.78 | 75.78 |
| Mass Flow | kg/h | 416.32 | 416.32 | 416.32 | 416.32 |
| Temperature | C. | 30.00 | 850.00 | 1500.00 | 1172.94 |
| Pressure | barg | 2.00 | 1.75 | 1.75 | 1.50 |
| Vapor Flow | Nm$^3$/h | 581.65 | 581.65 | 1140.03 | 1140.03 |
| Vapor Flow | m$^3$/h | 216.10 | 877.74 | 1822.52 | 1634.30 |
| Vapor Fraction |  | 1.0000 | 1.0000 | 0.6712 | 0.6712 |
| Molecular Weight |  | 16.04 | 16.04 | 5.49 | 5.49 |
| Molar Flow (Methane) | kgmole/h | 25.95 | 25.95 | 1.04 | 1.04 |
| Molar Flow (Hydrogen) | kgmole/h | 0.00 | 0.00 | 49.83 | 49.83 |
| Molar Flow (Carbon) | kgmole/h | 0.00 | 0.00 | 24.91 | 24.91 |
| Molar Flow (Carbon Monoxide) | kgmole/h | 0.00 | 0.00 | 0.00 | 0.00 |
| Molar Flow (Carbon Dioxide) | kgmole/h | 0.00 | 0.00 | 0.00 | 0.00 |
| Molar Flow (Nitrogen) | kgmole/h | 0.00 | 0.00 | 0.00 | 0.00 |
| Molar Flow (Oxygen) | kgmole/h | 0.00 | 0.00 | 0.00 | 0.00 |
| Molar Flow (Water) | kgmole/h | 0.00 | 0.00 | 0.00 | 0.00 |
| Molar Frac (Methane) | mol. fr | 1.0000 | 1.0000 | 0.0137 | 0.0137 |
| Molar Frac (Hydrogen) | mol. fr | 0.0000 | 0.0000 | 0.6575 | 0.6575 |
| Molar Frac (Carbon) | mol. fr | 0.0000 | 0.0000 | 0.3288 | 0.3288 |
| Molar Frac (Carbon Monoxide) | mol. fr | 0.0000 | 0.0000 | 0.0000 | 0.0000 |
| Molar Frac (Carbon Dioxide) | mol. fr | 0.0000 | 0.0000 | 0.0000 | 0.0000 |
| Molar Frac (Nitrogen) | mol. fr | 0.0000 | 0.0000 | 0.0000 | 0.0000 |
| Molar Frac (Oxygen) | mol. fr | 0.0000 | 0.0000 | 0.0000 | 0.0000 |
| Molar Frac (Water) | mol. fr | 0.0000 | 0.0000 | 0.0000 | 0.0000 |
| Molar Enthalpy | kcal/kgmole | −17768.01 | −6396.55 | 21947.26 | 18052.92 |
| Mass Enthalpy | kcal/kg | −1107.54 | −398.72 | 3994.70 | 3285.88 |
| Heat Flow | kcal/s | −128.08 | −46.11 | 461.96 | 379.99 |
| Molar Density | kgmole/m$^3$ | 0.12 | 0.03 | 0.03 | 0.03 |
| Mass Density | kg/m$^3$ | 1.93 | 0.47 | 0.15 | 0.17 |

Table 4 below shows the DC energy consumption for plasma reactor 100 with interchanger 124.

TABLE 4

| | |
|---|---|
| $CH_4$ converted in reactor | 25.95 kgmole/h |
| Enthalpy per mole @ 1500° C. for $CH_4$ conversion | 89.10 kJ/mole |
| Net enthalpy required from DC plasma | 2,312,145 kJ/h<br>643 kW |
| Energy to preheat feed to reactor 850° to 1500° C. | 1,440,000 kJ/h<br>400 kW |
| Electrode losses | 50 kW |
| Reactor furnace heat losses | 250 kW |
| Total power requirement | 1,343 kW |

A quick analysis of Tables 1 and Table 2 versus Table 3 and Table 4 shows one skilled in the art that there is almost a 20-21% reduction in energy when an interchanger is utilized in the process.

FIG. 2 presents a process flow schematic that incorporates all of the of the inventive aspects of this invention. In this arrangement an interchanger 12 receives and input feed 10 of aliphatic hydrocarbon, preferably comprising methane, and heats the input feed to a temperature in a range of 650-900° C., preferably from 800-900° C., and more preferably at around 850° C. A line 14 carries the heated feed to a plasma reactor arrangement 16 that houses a plasma generator. A DC electrical power source 20 provides plasma reactor arrangement 20 with a positive and a negative electrical input, each conducted in a controlled manner to plasma reactor arrangement 16 by one of a pair of conductors 18 to create a plasma arc in plasma reactor arrangement 16. Electrical power source 20 is linked to an electric generator and power supply unit which is designed to provide the DC current in a controlled manner by incorporating a rectifier section, a DC chopper and DC smoothing section. The plasma arc thermally disassociates the heated feed of line 14 to produce hydrogen and carbon black with less than 2% of other components. Such other components usually comprise primarily unreacted hydrocarbons such as methane and ethane.

Thermocouples, such as type K or B can monitor plasma reactor temperature for a control system that corrects the power input. Suitable electrode sizing; axial adjustment of the electrodes to control the gap between electrodes; and power input adjustments provide the necessary control of the plasma arc to obtain the temperature and residence time desired in the plasma reactor to pyrolyze the heated feed 14 and produce hydrogen and carbon black with desired properties. A line 19 provides a slip stream of hydrogen from a hydrogen recovery section (as hereinafter described) to stabilize the plasma arc as previously described. Other aspects of plasma reactor design and operation have been previously presented herein or are well known to those skilled in the art.

An output stream in a gaseous phase with a temperature ranging from 1300 to 1600° C. and a high loading of carbon black particles exits plasma reactor 16 and passes to interchanger 12 via line 20. The output stream comprises a gaseous mixture of hydrogen, carbon black particles in a concentration of about 25 wt. % hydrogen and 75 wt. % carbon.

Interchanger 12 harvests most of the enthalpy energy available from the output stream to promote a very high energy recovery and efficiency and preferably comprises a shell and multi-tube tube heat exchanger as previously described. Input feed 10, again in the manner previously described, passes through the shell side of interchanger 12 and output stream 20 passes through heat exchange tubes within interchanger 12. Input feed 10 typically enters interchanger 12 at temperature of about 40° C. and exits as cooled stream 22 at a temperature ranging from 600-1200° C., and more preferably in a range of 950 to 1175° C.

Cooled stream 22 passes to a secondary heat recovery zone 24 that recovers additional heat from cooled stream 22 and usually comprises a fired tube heat recovery boiler. This hot gas, a mixture of hydrogen and nano carbon particles, at a temperature of 1175° C. contains a significant amount of heat energy that needs recovery and valorization. At these temperatures, the hydrogen rich gas and the entrained particles can potentially cause serious embrittlement and erosion issues on the inside of the boiler tubes which typically comprise stainless steel metallurgy. In the preferred embodiment, 18" long Inconel® ferrules are inserted part way into the tube inlets within the heat transfer zone of the boiler. As the hot gases flow through the ferrules, heat exchange with the cooling medium on the shell side of the boiler reduces the gas temperature before it passes into the remaining stainless portion of the tubes. By the time the hot gas flows past the Inconel ferrules the surrounding boiling water lowers the temperature of the stainless tubes enough to eliminate the hydrogen embrittlement problem.

Medium pressure steam leaves secondary heat exchange zone 24 via a line 28, typically at temperature of about 225° C. and a pressure of 25 barg. A well-designed boiler can produce a significant quantity of medium pressure steam that provides additional energy for use within the process or other facilities. Using this steam to power a steam turbine driven generator can produce a large percentage of the required electric power for the plasma reactor or for other equipment and can significantly reduce process cost.

Cool gas leaves secondary heat recovery zone 24 via a line 28 and at a temperature in a range of 200 to 300° C. and preferably at a temperature of about 200° C. and pressure of greater than 0 barg and typically in a range greater than zero to 3 barg, preferably in a range of 0.1-0.5 barg and preferably slightly greater than 0 barg. The cool gas passes to a particle separator 30. Preferably the particle separator comprises a reverse gas filtering device that recovers solid carbon agglomerates for subsequent processing as a carbon product.

Cool gas stream 28 contains hydrogen, unconverted hydrocarbons, and carbon black and thus creates a highly combustible environment that necessitates a particle separator specifically suited for this application. Accordingly, such a system must use a non-combustible cleaning gas. Gas-solid separation systems suitable for such conditions are well known. Such systems preferably reduce the particle loading in the gas to less than <0.1 wt. %.

In the case of reverse gas filtering device for separator 30, the cool stream of nano carbon particles and hydrogen first enter a reverse gas filter. The carbon particles in this stream are primarily nano particles in the range of 15-150 nm, which when impinging on the filter will initially link together to form aggregates in the range of 100-500 nm and then will cross link one more time to form agglomerates in sizes ranging from 1-100+μm. This stepwise linking enables the reverse gas filter to trap in excess of 99.9% of the carbon particles flowing into the unit.

An RAF-IS system produced by Nederman® provides a particularly suitable gas-solid separation that can meet the separation and safety requirements of this process. The RAF-IS system operates in "reverse flow" wherein a gas stream laden with particles (the cool particle streams) enters the bottom of a bag house through an involute portion into a cyclone portion to produce a spiral flow to provide a cyclonic separation that produces a reduced particle stream. The reduced particle stream flows upward through filter bags to produce a downward flow of particles that leaves the bottom of the separation device and a cleaned gas stream with no more than a trace presence of particles that exits near the top of the separation device.

Regardless of separator type, particle separator 30 will deliver a carbon black particle stream 32 and a cleaned gas stream 34. The cleaned gas stream typically exits the particle separator 30 at low pressure that preferably only slightly exceeds 0 barg.

A cleaned gas stream 34 containing hydrogen exits particle separator 30 and passes through an air cooler (not shown) and into the suction side first compression stage 36. First compression stage 36 includes a water lubricated compressor that discharges a pressurized gas stream 38 at a pressure ranging from 6 to 15 barg, preferably 8 to 12 barg, and more preferably about 10 barg. The compressor in the first compression stage uses no lubricating oil in this compression operation and thereby eliminates any lubricant contamination of the pressurized gas stream 38. After leaving the compressor a compressed hydrogen stream containing water stream flows into a custom knockout vessel (not shown) where the water is collected, cooled, and recycled back into the compressor. The custom knockout vessel is provided with a filter to remove ultra fine carbon particles that may have escaped from the upstream particle separator. The gases exiting the knock-out vessel still contain some water and are directed into a high efficiency coalescer (not shown) to significantly decrease the moisture content of a pressurized gas stream 38.

This invention uses dual PSA (pressure swing adsorption) units to recover at least 80% of the available hydrogen at 99.99% purity from pressurized gas stream 38. PSA units use adsorbents that are porous solid materials with a large surface area and have significant selectivity towards gases with high polarity and low volatility. Consequently, a gas stream containing hydrogen will pass through an appropriate adsorbent in a PSA adsorption cycle without significant adsorption of the hydrogen because of its high volatility and low polarity. Passing the hydrogen gas stream through the adsorbent under pressure loads the pores of the adsorbent with adsorbable materials, which in this application comprise contaminants such as hydrocarbons and water. Once the pores reach a predetermined loading of adsorbed compounds the PSA enters a desorption cycle that rapidly depressurizes the adsorbent. The rapid depressurization produces a retentate containing the compounds desorbed from the adsorbent pores that is discharged from the PSA unit.

A PSA unit uses multiple adsorption vessels to perform cycles simultaneously for continuous operation of the PSA unit. PSA units typically contain 2-15 adsorption vessels. Those skilled in the art are well acquainted with other details of PSA units and their operation. In a preferred embodiment of this invention each PSA unit contains 7-9 adsorption vessels and more preferably, 9 adsorption vessels.

In this invention pressurized gas stream 38, at a temperature of about 80° C., flows into a primary PSA unit 40 that separates the hydrogen from any residual impurities and yields a primary hydrogen stream 42 with a 99.99% purity containing at least 80 wt. % hydrogen and preferably 85% or more of the available hydrogen in stream 38. Primary PSA unit 40 also discharges a first retentate stream 44 containing contaminants such as hydrocarbons and water along with a significant amount of hydrogen.

First retentate stream 44 passes into a second compression stage 45 that includes a water lubricated compressor that operates in essentially the same manner as first compression stage 36. Second compression stage 45 produces a compressed retentate stream 46, preferably with a pressure ranging from 6 to 15 barg, preferably 8 to 12 barg and more preferably about 10 barg.

Compressed retentate stream 46 enters a secondary PSA unit 48. The reduced volume of first retentate stream 44 relative to the volume of pressurized gas stream 38 permits the use of a smaller secondary PSA unit 48 as compared to the primary PSA unit 40. The first retentate volume typically equals less than 25% of the gas stream 38 and in most cases the first retentate volume is 20% or less of the volume of gas stream 38. Here again secondary PSA unit 48 recovers about 80% of the hydrogen in compressed retentate stream 46 as a secondary hydrogen stream 50. Secondary PSA unit 48 also produces a secondary raffinate stream that may pass to an on-site boiler for additional heat recovery. A hydrogen output stream 52 consolidates primary hydrogen stream 42 and secondary hydrogen stream 50 into a single hydrogen output stream. Hydrogen output stream 52 consists essentially of hydrogen at a purity of 99.99%. Primary hydrogen stream 42 contains at least 90 wt. % of the hydrogen available by plasma conversion of input stream 10. Hydrogen output 52 provides hydrogen for recovery as a product and/or for downstream utilization. A small fraction of the recovered hydrogen from the primary and/or secondary PSA supplies stabilization hydrogen for the plasma via line 19. Thus, the use of the primary and secondary PSA results in highly efficient recovery of maximum hydrogen from the input feed.

Tables 5A-5D below show a corresponding material balance for an embodiment that is based upon the process arrangement as shown in FIG. 2 and an incoming natural gas flow stream of 25.95 kmole/h (416.32 kg/h). The material balance was simulated using Aspen Plus V11.

TABLE 5A

| | | Stream No. | | |
|---|---|---|---|---|
| | | 10 | 14 | 19 |
| Molar Flow | kgmole/h | 25.95 | 25.95 | 2.42 |
| Mass Flow | kg/h | 416.32 | 416.32 | 4.88 |
| Temperature | C. | 30.00 | 850.00 | 30.00 |
| Pressure | barg | 2.00 | 1.75 | 2.00 |
| Vapor Flow | Nm$^3$/h | 581.65 | 581.65 | 54.20 |
| Vapor Flow | m$^3$/h | 216.10 | 877.74 | 7.11 |
| Vapor Fraction | | 1.0000 | 1.0000 | 1.0000 |
| Molecular Weight | | 16.04 | 16.04 | 2.02 |
| Molar Flow (Methane) | kgmole/h | 25.95 | 25.95 | 0.00 |
| Molar Flow (Hydrogen) | kgmole/h | 0.00 | 0.00 | 2.42 |

TABLE 5A-continued

|  |  | Stream No. | | |
| --- | --- | --- | --- | --- |
|  |  | 10 | 14 | 19 |
| Molar Flow (Carbon) | kgmole/h | 0.00 | 0.00 | 0.00 |
| Molar Flow (Carbon Monoxide) | kgmole/h | 0.00 | 0.00 | 0.00 |
| Molar Flow (Carbon Dioxide) | kgmole/h | 0.00 | 0.00 | 0.00 |
| Molar Flow (Nitrogen) | kgmole/h | 0.00 | 0.00 | 0.00 |
| Molar Flow (Oxygen) | kgmole/h | 0.00 | 0.00 | 0.00 |
| Molar Flow (Water) | kgmole/h | 0.00 | 0.00 | 0.00 |
| Molar Frac (Methane) | mol. fr | 1.0000 | 1.0000 | 0.0000 |
| Molar Frac (Hydrogen) | mol. fr | 0.0000 | 0.0000 | 0.0000 |
| Molar Frac (Carbon) | mol. fr | 0.0000 | 0.0000 | 0.0000 |
| Molar Frac (Carbon Monoxide) | mol. fr | 0.0000 | 0.0000 | 0.0000 |
| Molar Frac (Carbon Dioxide) | mol. fr | 0.0000 | 0.0000 | 0.0000 |
| Molar Frac (Nitrogen) | mol. fr | 0.0000 | 0.0000 | 0.0000 |
| Molar Frac (Oxygen) | mol. fr | 0.0000 | 0.0000 | 0.0000 |
| Molar Frac (Water) | mol. fr | 0.0000 | 0.0000 | 0.0000 |
| Molar Enthalpy | kcal/kgmole | −17768.01 | −6396.55 | — |
| Mass Enthalpy | kcal/kg | −1107.54 | −398.72 | — |
| Heat Flow | kcal/s | −128.08 | −46.11 | — |
| Molar Density | kgmole/m$^3$ | 0.12 | 0.03 | — |
| Mass Density | kg/m$^3$ | 1.93 | 0.47 | — |

TABLE 5B

|  |  | Stream No. | | | |
| --- | --- | --- | --- | --- | --- |
|  |  | 20 | 22 | 28 | 32 |
| Molar Flow | kgmole/h | 75.78 | 75.78 | 75.78 | 75.78 |
| Mass Flow | kg/h | 416.32 | 416.32 | 416.32 | 416.32 |
| Temperature | C. | 1500.00 | 1172.94 | 250.00 | 200.00 |
| Pressure | barg | 1.75 | 1.50 | 1.25 | 1.00 |
| Vapor Flow | Nm$^3$/h | 1140.03 | 1140.03 | 1140.03 | 1140.03 |
| Vapor Flow | m$^3$/h | 1822.52 | 1634.30 | 657.12 | 668.09 |
| Vapor Fraction |  | 0.6712 | 0.6712 | 0.6712 | 0.6712 |
| Molecular Weight |  | 5.49 | 5.49 | 5.49 | 5.49 |
| Molar Flow (Methane) | kgmole/h | 1.04 | 1.04 | 1.04 | 1.04 |
| Molar Flow (Hydrogen) | kgmole/h | 49.83 | 49.83 | 49.83 | 49.83 |
| Molar Flow (Carbon) | kgmole/h | 24.91 | 24.91 | 24.91 | 24.91 |
| Molar Flow (Carbon Monoxide) | kgmole/h | 0.00 | 0.00 | 0.00 | 0.00 |
| Molar Flow (Carbon Dioxide) | kgmole/h | 0.00 | 0.00 | 0.00 | 0.00 |
| Molar Flow (Nitrogen) | kgmole/h | 0.00 | 0.00 | 0.00 | 0.00 |
| Molar Flow (Oxygen) | kgmole/h | 0.00 | 0.00 | 0.00 | 0.00 |
| Molar Flow (Water) | kgmole/h | 0.00 | 0.00 | 0.00 | 0.00 |
| Molar Frac (Methane) | mol. fr | 0.0137 | 0.0137 | 0.0137 | 0.0137 |
| Molar Frac (Hydrogen) | mol. fr | 0.6575 | 0.6575 | 0.6575 | 0.6575 |
| Molar Frac (Carbon) | mol. fr | 0.3288 | 0.3288 | 0.3288 | 0.3288 |
| Molar Frac (Carbon Monoxide) | mol. fr | 0.0000 | 0.0000 | 0.0000 | 0.0000 |
| Molar Frac (Carbon Dioxide) | mol. fr | 0.0000 | 0.0000 | 0.0000 | 0.0000 |
| Molar Frac (Nitrogen) | mol. fr | 0.0000 | 0.0000 | 0.0000 | 0.0000 |
| Molar Frac (Oxygen) | mol. fr | 0.0000 | 0.0000 | 0.0000 | 0.0000 |
| Molar Frac (Water) | mol. fr | 0.0000 | 0.0000 | 0.0000 | 0.0000 |
| Molar Enthalpy | kcal/kgmole | 21947.26 | 18052.92 | 6298.21 | 5572.09 |
| Mass Enthalpy | kcal/kg | 3994.70 | 3285.88 | 1146.36 | 1014.20 |
| Heat Flow | kcal/s | 461.96 | 379.99 | 132.57 | 117.29 |
| Molar Density | kgmole/m$^3$ | 0.03 | 0.03 | 0.08 | 0.08 |
| Mass Density | kg/m$^3$ | 0.15 | 0.17 | 0.43 | 0.42 |

TABLE 5C

| | | Stream No. | | | |
|---|---|---|---|---|---|
| | | 34 | 38 | 42 | 44 |
| Molar Flow | kgmole/h | 50.86 | 50.86 | 42.36 | 8.51 |
| Mass Flow | kg/h | 117.09 | 117.09 | 85.44 | 31.65 |
| Temperature | C. | 50.00 | 45.00 | 45.00 | 45.00 |
| Pressure | barg | 0.75 | 8.25 | 8.00 | 0.50 |
| Vapor Flow | Nm$^3$/h | 1140.03 | 1140.03 | 949.34 | 190.69 |
| Vapor Flow | m$^3$/h | 775.84 | 146.04 | 124.98 | 148.84 |
| Vapor Fraction | | 1.0000 | 1.0000 | 1.0000 | 1.0000 |
| Molecular Weight | | 2.30 | 2.30 | 2.02 | 3.72 |
| Molar Flow (Methane) | kgmole/h | 1.04 | 1.04 | 0.00 | 1.03 |
| Molar Flow (Hydrogen) | kgmole/h | 49.83 | 49.83 | 42.35 | 7.47 |
| Molar Flow (Carbon) | kgmole/h | 0.00 | 0.00 | 0.00 | 0.00 |
| Molar Flow (Carbon Monoxide) | kgmole/h | 0.00 | 0.00 | 0.00 | 0.00 |
| Molar Flow (Carbon Dioxide) | kgmole/h | 0.00 | 0.00 | 0.00 | 0.00 |
| Molar Flow (Nitrogen) | kgmole/h | 0.00 | 0.00 | 0.00 | 0.00 |
| Molar Flow (Oxygen) | kgmole/h | 0.00 | 0.00 | 0.00 | 0.00 |
| Molar Flow (Water) | kgmole/h | 0.00 | 0.00 | 0.00 | 0.00 |
| Molar Frac (Methane) | mol. fr | 0.0204 | 0.0204 | 0.0001 | 0.1215 |
| Molar Frac (Hydrogen) | mol. fr | 0.9796 | 0.9796 | 0.9999 | 0.8785 |
| Molar Frac (Carbon) | mol. fr | 0.0000 | 0.0000 | 0.0000 | 0.0000 |
| Molar Frac (Carbon Monoxide) | mol. fr | 0.0000 | 0.0000 | 0.0000 | 0.0000 |
| Molar Frac (Carbon Dioxide) | mol. fr | 0.0000 | 0.0000 | 0.0000 | 0.0000 |
| Molar Frac (Nitrogen) | mol. fr | 0.0000 | 0.0000 | 0.0000 | 0.0000 |
| Molar Frac (Oxygen) | mol. fr | 0.0000 | 0.0000 | 0.0000 | 0.0000 |
| Molar Frac (Water) | mol. fr | 0.0000 | 0.0000 | 0.0000 | 0.0000 |
| Molar Enthalpy | kcal/kgmole | −189.70 | −222.88 | 138.09 | −2020.94 |
| Mass Enthalpy | kcal/kg | −82.40 | −96.81 | 68.46 | −543.20 |
| Heat Flow | kcal/s | −2.68 | −3.15 | 1.62 | −4.78 |
| Molar Density | kgmole/m$^3$ | 0.07 | 0.35 | 0.34 | 0.06 |
| Mass Density | kg/m$^3$ | 0.15 | 0.80 | 0.68 | 0.21 |

TABLE 5D

| | | Stream No. | | | |
|---|---|---|---|---|---|
| | | 46 | 54 | 50 | 52 |
| Molar Flow | kgmole/h | 8.51 | 2.53 | 5.98 | 48.34 |
| Mass Flow | kg/h | 31.65 | 19.59 | 12.06 | 97.50 |
| Temperature | C. | 45.00 | 45.00 | 45.00 | 45.00 |
| Pressure | barg | 8.25 | 8.25 | 8.25 | 8.00 |
| Vapor Flow | Nm$^3$/h | 190.69 | 56.66 | 134.02 | 1083.36 |
| Vapor Flow | m$^3$/h | 24.42 | 7.24 | 17.17 | 142.62 |
| Vapor Fraction | | 1.0000 | 1.0000 | 1.0000 | 1.0000 |
| Molecular Weight | | 3.72 | 7.75 | 2.02 | 2.02 |
| Molar Flow (Methane) | kgmole/h | 1.03 | 1.03 | 0.00 | 0.00 |
| Molar Flow (Hydrogen) | kgmole/h | 7.47 | 1.49 | 5.98 | 48.33 |
| Molar Flow (Carbon) | kgmole/h | 0.00 | 0.00 | 0.00 | 0.00 |
| Molar Flow (Carbon Monoxide) | kgmole/h | 0.00 | 0.00 | 0.00 | 0.00 |
| Molar Flow (Carbon Dioxide) | kgmole/h | 0.00 | 0.00 | 0.00 | 0.00 |
| Molar Flow (Nitrogen) | kgmole/h | 0.00 | 0.00 | 0.00 | 0.00 |
| Molar Flow (Oxygen) | kgmole/h | 0.00 | 0.00 | 0.00 | 0.00 |
| Molar Flow (Water) | kgmole/h | 0.00 | 0.00 | 0.00 | 0.00 |
| Molar Frac (Methane) | mol. fr | 0.1215 | 0.4087 | 0.0001 | 0.0001 |
| Molar Frac (Hydrogen) | mol. fr | 0.8785 | 0.5913 | 0.9999 | 0.9999 |
| Molar Frac (Carbon) | mol. fr | 0.0000 | 0.0000 | 0.0000 | 0.0000 |
| Molar Frac (Carbon Monoxide) | mol. fr | 0.0000 | 0.0000 | 0.0000 | 0.0000 |
| Molar Frac (Carbon Dioxide) | mol. fr | 0.0000 | 0.0000 | 0.0000 | 0.0000 |
| Molar Frac (Nitrogen) | mol. fr | 0.0000 | 0.0000 | 0.0000 | 0.0000 |
| Molar Frac (Oxygen) | mol. fr | 0.0000 | 0.0000 | 0.0000 | 0.0000 |
| Molar Frac (Water) | mol. fr | 0.0000 | 0.0000 | 0.0000 | 0.0000 |

TABLE 5D-continued

| | | Stream No. | | | |
|---|---|---|---|---|---|
| | | 46 | 54 | 50 | 52 |
| Molar Enthalpy | kcal/kgmole | −2020.57 | −7129.53 | 138.20 | 138.11 |
| Mass Enthalpy | kcal/kg | −543.09 | −920.04 | 68.51 | 68.46 |
| Heat Flow | kcal/s | −4.78 | −5.01 | 0.23 | 1.85 |
| Molar Density | kgmole/m$^3$ | 0.35 | 0.35 | 0.35 | 0.34 |
| Mass Density | kg/m$^3$ | 1.30 | 2.71 | 0.70 | 0.68 |

In addition to hydrogen, carbon black is another product recovered from the process of this invention. The carbon black will typically comprise high value carbon black. It can constitute high grade electroconductive carbon black and/or small particle carbon black as previously described. The carbon black product may benefit from grit reduction, in particular a reduction to 1 ppm or less of any particles over a 325 mesh. Those skilled in the art know of many types of equipment for reducing grit to his level.

The Mikro ACM® Air Classifying Mill Specially is specifically designed for the grit reduction of carbon black. The Mikro ACM® Air Classifying Mill contains suitable grinding and classification sections to meet the particle characteristics and quality specification of carbon black. It can operate at temperatures of up to 200° C. and produce clean, high quality carbon black from poor grades of material.

The principles and modes of operation of this invention have been described above with reference to various exemplary and preferred embodiments. As understood by those of skill in the art, the overall invention, as defined by the claims encompasses other preferred embodiments not specifically enumerated herein.

We claim:

1. A plasma pyrolysis process for the production and recovery of high purity hydrogen from an input feed comprising an aliphatic hydrocarbon, the process comprising:
   a. heating the input feed to a temperature in a range of 800 to 900° C. using an interchanger to provide a heated feed;
   b. passing the heated feed to a plasma reactor comprising two carbon electrodes separated by a gap that each receive electric power from an electric power source to create a plasma environment having a temperature in a range of 1300 to 1600° C. to pyrolyze aliphatic hydrocarbons and produce an output stream comprising hydrogen, carbon, and aliphatic hydrocarbon;
   c. injecting a stabilizing gas in the gap between the two electrodes to stabilize the plasma environment;
   d. passing the output stream to the interchanger, transferring heat from the output stream to at least partially heat the input feed according to step a., and cooling the output stream to produce a cooled stream with a temperature in a range of 600 to 1200° C.
   e. passing the cooled stream to a secondary heat recovery zone to recover heat from the cooled stream and produce a cool stream;
   f. passing the cool gas stream to a particle separator to separate particles comprising carbon from the cool stream to produce a gas phase, cleaned gas stream comprising hydrogen and a particle output stream comprising carbon;
   g. compressing the cleaned gas stream and passing the compressed, cleaned gas stream to a first pressure swing adsorption unit and recovering from the first pressure swing adsorption unit a first permeate that provides a first product stream consisting essentially of hydrogen at a concentration of at least 99.99% and a first retentate stream containing hydrogen; and,
   h. compressing the first retentate stream and passing the first retentate to a second pressure swing adsorption unit and recovering a second retentate stream and a second permeate from the second pressure swing adsorption unit and the second permeate stream providing a second product stream consisting essentially of hydrogen at a concentration 99.99 wt. % hydrogen.

2. The process of claim 1 wherein the plasma reactor is powered by a DC source that comprises a rectifier chopping section and a smoothing section.

3. The process of claim 1 wherein the interchanger comprises a shell and tube type heat exchanger, the output stream passes through the tubes, and the tubes comprise silicon carbide.

4. The process of claim 1 wherein the stabilizing gas comprises a portion of the first product stream and/or the second product stream.

5. The process of claim 1 wherein the secondary heat recovery zone comprises a fired tube boiler that produces steam for electric power production; the cooled stream passes through stainless tubes within the boiler; and an Inconel ferrule extends partially inside the tube starting from the tube inlet.

6. The process of claim 1 wherein the particle separator comprises a cyclone with an involute inlet that removes particles from gases in the cool stream to produce a first particle stream comprising carbon particles and a reduced particle stream having a particle loading less than that of the cool stream; the reduced particle stream passes to a bag filter unit that passes the reduced particle stream through bag filter elements to produce the cleaned gas stream and a second particle stream comprising carbon particles; a gas phase cleaning stream passes through the bag filter elements in reverse flow to remove particles from the bag filter elements; and the gas phase cleaning stream comprises a gas that will not combust with any components of the reduced particle stream.

7. The process of claim 6 wherein the cleaning stream comprises a portion of the retentate stream, the first product stream, and/or the second product stream.

8. The process of claim 6 wherein the first and second particle streams comprise carbon nano particles in the range of 15-150 nm that impinge on the bag filter elements to form aggregates in the range 100-500 nm that can crosslink to form agglomerates having a size of at least 1 μm.

9. The process of claim 8 wherein the agglomerates range in size from 1 μm to 100 μm.

10. The process of claim 1 wherein a water lubricated screw compressor compresses the cleaned gas stream and the water lubricant scrubs residual carbon particles from the cleaned gas stream.

11. The process of claim 10 wherein the water lubricated compressor receives essentially no oil lubricant and the water lubricant can remove particles at parts per billion levels.

12. The process of claim 1 wherein the cool stream has a temperature in a range of 30 to 95° C.

13. A plasma pyrolysis process for the production and recovery of high purity hydrogen from an input feed comprising an aliphatic hydrocarbon, the process comprising:
   a. heating the input feed to a temperature of at least 850° C. using an interchanger to provide a heated feed;
   b. passing the heated feed to a plasma reactor comprising two carbon electrodes separated by a gap that each receive electric power from an electric power source to create a plasma environment having a temperature in a range 1400 to 1550° C. to pyrolyze aliphatic hydrocarbon and produce an output stream comprising hydrogen, carbon, and aliphatic hydrocarbon;
   c. injecting a first product stream and/or a second product stream in the gap between the two electrodes to stabilize the plasma environment;
   d. passing the output stream to the interchanger, transferring heat from the output stream to at least partially heat the input feed according to step a, and cooling the output stream to produce a cooled stream with a temperature in a range of 600 to 1150° C.;
   e. passing the cooled stream to a secondary heat recovery zone to recover heat from the cooled stream and produce a cool stream;
   f. passing the cool gas stream to a particle separator to remove particles comprising carbon from the cool stream to produce a gas phase, cleaned gas stream comprising hydrogen and a particle output stream comprising carbon wherein the particle separator comprises a cyclone that separates particles from gases in the cool stream to produce a first particle stream comprising carbon particles and a reduced particle stream having a particle loading less than that of the cool stream, the reduced particle stream passes to a bag filter unit that passes the reduced particle stream through bag filter elements to produce a second particle stream comprising carbon particles and to produce the cleaned gas stream; the cleaned gas stream exits the particle separator at a pressure in a range greater than 0 barg to 3 barg, a gas phase cleaning stream passes through the bag filter elements in reverse flow to remove particles from the bag filter elements, and the gas phase cleaning stream comprises a gas that will not combust with any components of the reduced particle stream;
   g. compressing the cleaned gas stream to a pressure in a range 8 to 12 barg and passing the compressed, cleaned gas stream to a first pressure swing adsorption unit and recovering from the first pressure swing adsorption unit a first permeate that provides the first product stream consisting essentially of hydrogen at a concentration of at least 99.99% and a first retentate stream containing hydrogen; and,
   h. compressing the first retentate stream and passing the first retentate to a second pressure swing adsorption unit and recovering from the second pressure swing adsorption unit a second retentate and a second permeate that provides the second product stream consisting essentially of hydrogen at a concentration 99.99 wt. % hydrogen.

14. The process of claim 13 wherein the plasma reactor is powered by a DC source that comprises a rectifier chopping section and smoothing section.

15. The process of claim 13 wherein the interchanger comprises a shell and tube type heat exchanger, the output stream passes through the tubes, and the tubes comprise silicon carbide.

16. The process of claim 13 wherein the secondary heat recovery zone comprises a fired tube boiler that produces steam for electric power production, and the cooled stream passes through stainless steel tubes within the boiler and Inconel ferrules extending partially inside the stainless steel tube starting from the tube inlet.

17. The process of claim 13 wherein the first and second particle streams comprise carbon nano particles in the range of 15-150 nm that impinge on the bag filter elements to form aggregates in the range 10-500 nm that can crosslink to form agglomerates ranging from 1-100 μm.

18. The process of claim 13 wherein a water lubricated screw compressor compresses the cleaned gas stream to a pressure of 0 barg to 15 barg and the water lubricant scrubs residual carbon particles from the cleaned gas stream.

19. The process of claim 18 wherein the water lubricated screw compressor receives essentially no oil lubricant and the water lubricant can remove particles at parts per billion levels.

20. The process of claim 13 wherein the plasma reactor comprises a metal outer shell that supports a refractory lining.

21. A plasma pyrolysis process for the production and recovery of high purity hydrogen from an input feed comprising methane, the process comprising:
   a. heating the input feed to a feed temperature of at least 850° C. in a shell and tube interchanger to provide a heated feed wherein the tubes comprise silicon carbide, the input feed passes through the shell side of the interchanger, and the interchanger supplies enough heat to maintain the input feed at the feed temperature;
   b. passing the heated feed to a plasma reactor comprising two carbon electrodes separated by a gap that each receive electric power from a DC source to create a plasma environment having a temperature in a range of 1400 to 1550° C. to pyrolyze methane and produce an output stream comprising hydrogen, carbon, and methane;
   c. injecting a portion of a first product stream and/or a second product stream in the gap between the two electrodes to stabilize the plasma environment;
   d. passing the output stream to the interchanger, transferring heat from the output stream to heat the input feed to the feed temperature according to step a., and cooling the output stream to produce a cooled stream with a temperature in a range of 600 to 1150° C.;
   e. passing the cooled stream to a secondary heat recovery zone to recover heat from the cooled stream and produce a cool stream having a temperature of 200 to 300° C.;
   f. passing the cool gas stream to a particle separator to remove particles comprising carbon from the cool stream to produce a gas phase, cleaned gas stream comprising hydrogen along with unconverted hydrocarbons and a particle output stream comprising carbon particles wherein the particle separator comprises a cyclone with an involute inlet that separates particles from gases in the cool stream to produce a first particle stream comprising carbon particles and a reduced particle stream having a particle loading less than that of the cool stream, the reduced particle stream enters a bag filter unit that passes the reduced particle stream through bag filter elements to produce a second particle stream comprising carbon particles and to produce the cleaned gas stream; the cleaned gas stream exits the particle separator at a pressure in a range of 0.1 to 0.5 barg, a gas phase cleaning stream passes through the bag filter elements in reverse flow to remove particles from the bag filter elements, and the gas phase cleaning stream comprises hydrogen;

g. compressing the cleaned gas stream to a pressure in a range of 8 to 12 barg in a water lubricated screw compressor that receives essentially no oil and passing the compressed, cleaned gas stream to a first pressure swing adsorption unit and recovering from the first pressure swing adsorption unit a first permeate that provides the first product stream consisting essentially of hydrogen at a concentration of at least 99.99% and a first retentate containing hydrogen; and, h. compressing the first retentate stream to a pressure in a range of 8 to 12 barg with a water lubricated screw compressor that receives essentially no oil and passing the first retentate to a second pressure swing adsorption unit and recovering from the second pressure swing adsorption unit a second retentate and a second permeate that provides the second product stream consisting essentially of hydrogen at a concentration 99.99 wt % hydrogen.

22. The process of claim 21 wherein the portion of the first and/or the portion of the second permeate stream is recovered at a pressure suitable for injection into the plasma reactor.

* * * * *